Feb. 1, 1938.  F. E. PETTIT, JR  2,106,958
COMBINED MARINE GEARSET AND REDUCTION GEAR
Filed Sept. 22, 1936
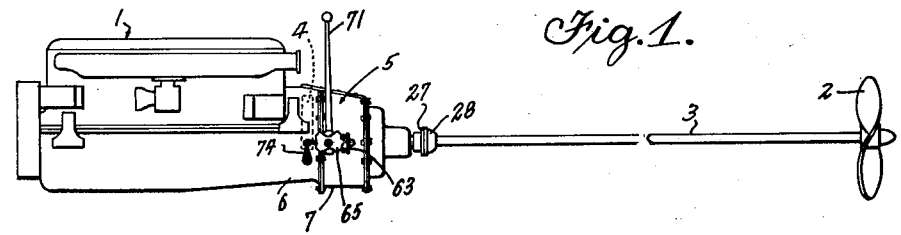
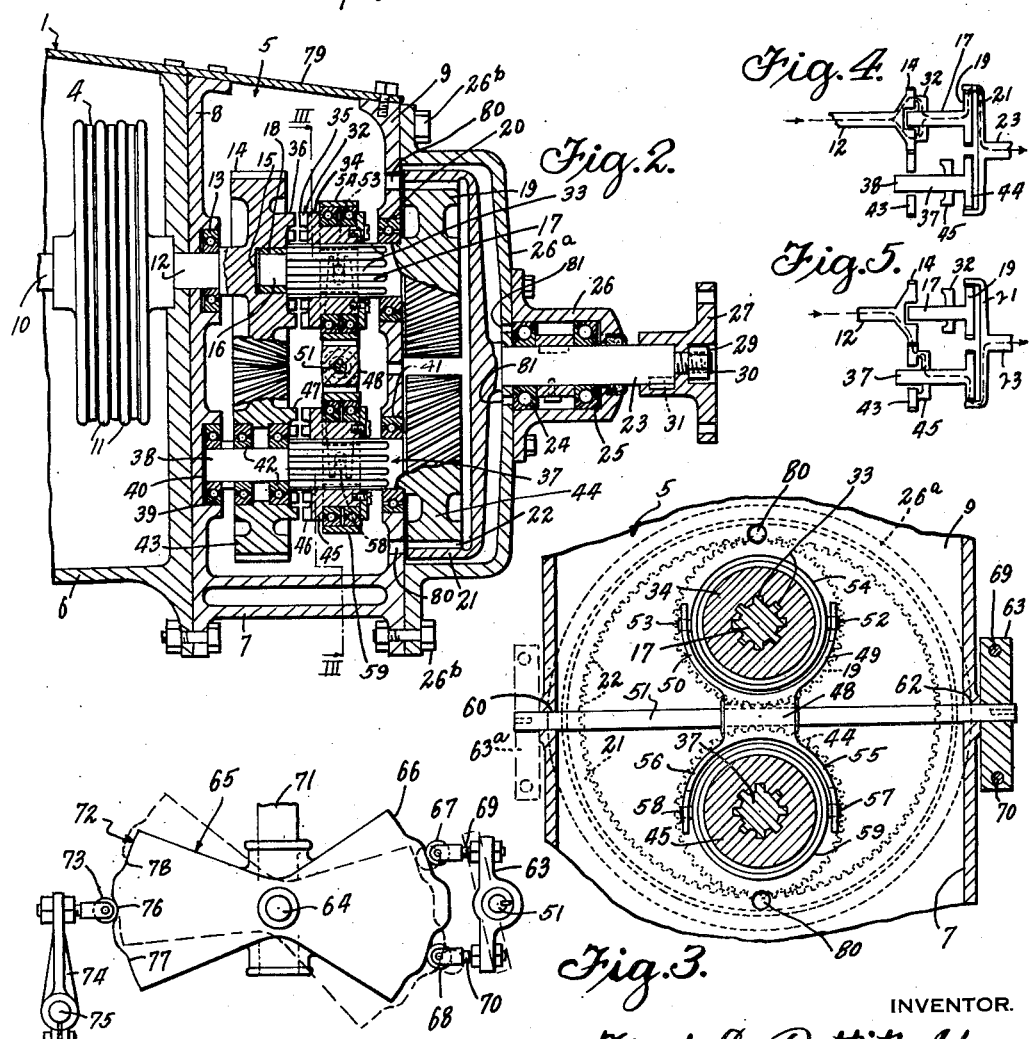
INVENTOR.
Fred E. Pettit Jr.
BY Lyon & Lyon
ATTORNEYS Patented Feb. 1, 1938

2,106,958

UNITED STATES PATENT OFFICE 2,106,958

COMBINED MARINE GEARSET AND REDUCTION GEAR

Fred E. Pettit, Jr., Beverly Hills, Calif.

Application September 22, 1936, Serial No. 101,933

8 Claims. (Cl. 74—361)

My invention relates to gearsets and has particular reference to a combined marine reversing gear mechanism and reduction gear adapted to be employed for transmitting power from a prime mover such, as an internal combustion motor or engine, to a propeller shaft so that the latter may be operated at a lower rotative speed than the speed of rotation of the crankshaft of the engine.

In power transmission systems, particularly those employed for driving power boats, it is the common practice to employ an internal combustion engine as the source of power or prime mover and in order to obtain the greater efficiency and economy of relatively high motor speeds and the greater hydraulic efficiency of relatively low marine screw propeller speeds, to connect this engine with a propeller through the agency of firstly, a reversing mechanism, and, secondly, a reduction gear, the latter of which causes the propeller and its shaft to rotate at a speed considerably slower than the speed of operation of the internal combustion engine. In such installations it is necessary that the propeller shaft be capable of being operated in the reverse direction to the direction in which the engine crank rotates and also to be disconnected from the motor so that the propeller may remain stationary notwithstanding operation of the motor. The gear system herein described is adapted for both forward and rearward movement of the boat, and also for placement in a neutral position so that the propeller will not turn notwithstanding operation of the motor; and in one mechanism combines the reversing gear with the reduction gear, each in its construction and operation being integral with and a part of the other.

Previous gear systems which have been employed for this purpose, particularly gearsets of the planetary type, have ordinarily employed spur gears or gears having external teeth and in which it has been necessary to provide a plurality of countershafts and a plurality of gears requiring considerable space for their proper location and mounting, and requiring considerable space for the location of the external gears employed thereon, making the complete gearset a relatively large and cumbersome and complicated structure. Further, the gearsets now in common use employing external toothed gears, necessarily require relatively small gears meshed with each other and operating at a relatively high speed, wherein the friction losses, due to the friction of the external surfaces of the gear teeth relative to each other, are great and cause considerable heat in the gearset, sometimes making it necessary to employ some cooling arrangement for the purpose of maintaining these gears in proper cooled condition.

It is an object of my invention to provide a combined gearset and reduction gear for rotative speed reduction between a prime mover and a propeller shaft thus to be operated at a reduced speed, wherein the driven gear of the reduction unit is an internal gear permanently meshed with a driving gear driven by the engine or prime mover and the entire gearset and reduction gear constitutes one mechanical unit, each operating part integral with and a part of the other operating parts thereof.

Another object of the invention is to provide a gearset of the character set forth in the preceding paragraph, wherein the gearset is simple and compact, and occupies relatively little space in an installation.

Another object of the invention is to provide a gearset of the character set forth in the preceding paragraph, in which a reversing gear mechanism comprising a second driving gear permanently meshed with the internal gear may be driven in a direction reverse to the main forward driving gear, or as desired, the gearset may be completely disengaged.

Another object of my invention is to provide a combined gearset and reduction gear affording one hundred per cent (100%) reverse speed; that is to say, with the motor operating at a fixed speed the propeller shaft shall operate in the reverse direction at the same speed as in the forward direction.

Another object of the invention is to provide a gearset of the character set forth in the preceding paragraphs, wherein a pair of dog clutch members, one upon each of said shafts, is employed for selectively connecting the engine for effective driving relation of either said main driving gear or said reverse driving gear.

Another object of my invention is to provide a simple combined gearset and reduction gear having but a single countershaft only, a minimum number of gear wheels, relatively large diameters of each gear wheel used, and simple, and relatively inexpensive of construction and maintenance.

Another, and primary, object of my invention is to provide a combined gearset and reduction gear of such character as can readily be used with standard truck or automobile motors, using standard motor vehicle clutches, thus to obtain for marine use the economy and efficiency of modern high speed internal combustion motors, together with the greater hydraulic efficiency of relatively slow turning marine propellers.

Another object of my invention is to obtain in forward drive position, the total elimination of transmission of power from an external gear into another external gear, and to accomplish the reduction in rotative speed of the propeller shaft by transmitting the power from an external gear into an internal gear, whereby gear-tooth friction is materially reduced, thus materially lessening both gear wear and heating.

Another object of my invention is to effect reverse operation of the propeller shaft by the use of only two gears through which power may be transmitted from the engine shaft line direct to the single countershaft, and thence directly into the reduction unit, as in the forward drive situation.

Another object of my invention is to provide a reduction gear having materially less offset between the center line of the driving shaft transmitting power from the motor and the center line of the driven or propeller shaft, than can be afforded by the use of external gears only in transmitting power from the engine shaft line through such external gears to the propeller shaft line.

Another object of my invention is to combine the gearset, the reduction gear and the thrust bearing in an oil-tight housing so that all thereof may be splash lubricated either in connection with the engine lubrication system or separate therefrom, the wall sections of the casing or housing between the gearset on the one hand and the reduction gear and thrust bearing on the other hand having openings therein to provide for free splash movement of the lubricant to all parts of the gearset, the reduction gear and the thrust bearing.

Another object of the invention is to provide a gearset of the character set forth in the preceding paragraphs, wherein a relatively simple single lever and cam may be employed for operating the normal clutch employed to connect the engine with a gearset and gear reduction mechanism and also to operate the shaft dog clutch mechanisms to selectively connect the main or reverse driving gears in effective driving relation with the engine.

Another object of my invention with respect to the lever and cam actuating mechanism just referred to is that such lever and cam mechanism may be placed on either side of the gear case, and the cam and the roller levers operating thereon may be placed either inside the gear case, or outside thereof.

Another object of my invention with respect to the lever and cam actuating mechanism just referred to is that the roller levers operating on the cam are each separately adjustable, both with respect to clutch operation and with respect to the sliding dog operation on the splined shaft within the gearset.

Other objects and advantages will be apparent from a study of the following specifications, read in connection with the accompanying drawing, wherein Figure 1 is a side elevational view of a typical engine, propeller, propeller shaft, combined gearset and reduction gear installation and actuating mechanism embodying my invention;

Fig. 2 is a vertical sectional view through the gearset and reduction gear constructed in accordance with my invention, neither of the dog clutches being engaged, and the gear therefore in neutral position;

Fig. 3 is a vertical lateral sectional view of the gearset constructed in accordance with my invention, taken along line III—III of Fig. 2;

Fig. 4 is a diagrammatic view, showing by dotted lines the course through which power is transmitted, when the forward drive dog clutch is engaged, and the propeller shaft is thus being driven in the same rotative direction as the engine shaft, but at reduced speed;

Fig. 5 is a diagrammatic view, showing by dotted lines the course through which power is transmitted, when the reverse drive dog clutch is engaged, and the propeller shaft is being driven in the opposite rotative direction from the engine shaft, but at similar reduced speed; and Fig. 6 is an enlarged detail view of the clutch and gear reversing mechanism which may be employed in the operation of my gearset.

Referring to the drawing, I have illustrated in Fig. 1 a source of power or prime mover pictured as an internal combustion engine 1, which is adapted to drive a propeller 2 connected upon the end of a propeller shaft 3. Interposed between the engine 1 and the propeller shaft 3 is a clutch 4 which may be of any desired character, and a combined gearset and reduction gear 5 as more fully illustrated in Fig. 2, constructed in accordance with my invention and containing suitable gearing as herein described by which the speed of rotation of the propeller shaft is reduced to a rotative speed, as much less than that of the crankshaft of the engine as may be desired.

By referring particularly to Fig. 2 it will be observed that the clutch 4 is illustrated as being located within a suitable housing 6 which may be formed as a part of the casting of the internal combustion engine 1 or may be a separate part attached thereto, as will be well understood by those skilled in the art. The gearset 5 includes a suitable casing 7, having a front wall 8 and a rear wall 9. The crankshaft 10 of the engine is coupled through clutch plates 11 to a drive shaft 12 which extends through the front wall 8 of the gearset casing 7, where it is mounted upon a suitable plane, roller or ball bearing 13, the latter of which is probably more desirable. Mounted upon, or formed integrally with the drive shaft 12, is a drive shaft gear 14 which may be of any desired construction, though I prefer to form the same as an externally toothed spiral or helically cut gear. Formed in the rear face of the gear 14 is a recess 15 into which projects one end 16 in somewhat reduced size of a splined drive gear shaft 17, the shaft 17 being rotatably mounted in the recess 15, as by means of a suitable bearing bushing 18, or a roller or ball bearing as may be deemed most suitable. A plain bearing bushing will probably be adequate for all purposes at this point as there is no rotary motion in that bearing when the forward dog clutch is engaged. On the end of the drive gear shaft 17, opposite to the end 16, is mounted or formed a main drive gear 19 which, like the gear 14, is preferably an externally toothed spiral or helically cut gear.

As will be observed from an inspection of Fig. 2, the main drive gear 19 is located upon the exterior of the rear wall 9 of the gearset casing 7 and the rear wall 9 contains a ball or roller bearing 20 for supporting the right-hand end of the shaft 17 as viewed in Fig. 2. Surrounding the main drive gear 19 is a bell-shaped internal gear 21 having spiral or helically cut internal teeth 22 thereon permanently meshed with the teeth of the main drive gear 19. The internal gear 21 is secured to or is formed integrally with a tail shaft or driven shaft 23 which is rotatably mounted upon a pair of spaced bearings 24 and 25, which bearings are in turn carried by a shell 26 attached to a gear housing 26a which extends over and encloses the internal gear 21, the gear housing 26a being secured to the casing 7 by any suitable means such as bolts 26b. The bearings 24 and 25 are preferably so constructed as to operate as both fore and aft thrust bearings. Secured upon the outer end of the driven shaft 23 is a coupling member 27 by which a complementary coupling member 28, (shown in Fig. 1) secured to the propeller shaft 3 is connected to the driven shaft 23. The coupling member 27 may be held upon the shaft 23 by any suitable means, such as a suitable key 31 and a nut 29 threaded upon a reduced end 30 of the shaft 23 in order firmly to connect the shaft 23 and the coupling member 27 and to lock these members against relative rotation.

It will be noted from the apparatus thus far described that the gear 14 is continuously rotated directly by the crankshaft 10 of the engine whenever the clutch plates 11 are engaged, but that the driven gear 19 is not coupled to the gear 14 and will not be rotated until a suitable dog clutch 32 is engaged with the gear 14. The shaft 17 is illustrated as having a plurality of splines 33 thereon extending longitudinally of the shaft 17 and on which a dog clutch collar 34 is slidably mounted with movement longitudinal of the shaft 17. The clutch collar 34 is provided with clutch teeth or dogs 35 extending toward and engageable with similar clutch teeth or dogs 36 formed upon the outer face of the gear 14 so that whenever the clutch collar 34 is moved toward the left, as viewed in Figs. 2 and 4 and engages its dogs 35 with the dogs 36, the rotation of the crankshaft 10 of the engine will be directly transmitted to the shaft 17 and will rotate the main drive gear 19 in the same direction and at the same speed as the crankshaft of the engine operates. By suitably selecting the diameter of the main drive gear 19 relative to the internal gear 21 any desired reduction in the speed of rotation of the driven shaft 23 will be obtained, depending upon the particular installation and the speed ratio selected for the propeller shaft relative to the engine speed.

By the employment of a single countershaft in my gearset and reduction gear housing, I can also obtain a reverse operation of the driven shaft 23, and I have illustrated such countershaft 37 as having one of its ends 38 journaled in a suitable bearing 39 secured in a flange recess 40 on the front wall 8 of the casing 7, while its opposite end extends through an opening 41 in the rear wall 9 of the casing 7 which contains an appropriate ball or roller bearing for that end of the shaft 37. The end 38 of the shaft 37 is illustrated as being of a less diameter than the main body of the countershaft 37 and has mounted thereon, as by means of a ball or roller bearing 42, an idler gear 43, which, like the gear 14, is preferably formed as an external toothed spiral or helically cut gear permanently meshed with the gear 14 so that as the gear 14, directly connected to the engine 1 by shaft 10 is rotated in one direction the idler gear 43 will be rotated in the reverse direction.

The shaft 37 bears upon its outer end a reverse driving gear 44 which like the main driving gear 19 is preferably formed as an external toothed spiral or helically cut gear permanently meshed with the internal gear 21.

While I prefer to mount the shaft 37 relative to the shaft 17 in such manner that the gear 44 engages the internal gear 21 at the side of the gear 21 opposite to its engagement with the main drive gear 19, it will be understood by those skilled in the art that the relative location of the shafts 17 and 37 may be selected to fit any desired position required by the design of the casing and to accord with whatever gear reduction ratio is selected, that is to say shafts 17 and 37 may be in the same vertical plane or the same horizontal plane or any other plane, and gears 19 and 44 may operate in the same vertical plane or in parallel vertical planes all within the internal gear 21.

It will be noted that the mounting of the idler gear 43 upon the shaft 37 is such that it will freely rotate relative to the shaft upon ball or roller bearings 42 and I provide a clutch collar 45 splined upon the shaft 37 in the same manner as the clutch collar 34 is splined upon the shaft 17 so that the collar 45 may be moved longitudinally of the shaft 37 to mesh its clutch teeth or dogs 46 with suitable clutch teeth or dogs 47 formed upon the outer face of the idler gear 43. Thus by moving the clutch collar 45 into engaging relation with the idler gear 43, the rotation of the crankshaft 10 of the engine in one direction will, through the gears 14 and 43, rotate the gear 44 in a direction reverse to the movement of the crankshaft 10 and since the internal gear 21 is permanently meshed with the reverse gear 44 the driven shaft 43 will be driven in a reverse direction. By suitably selecting the ratio between the gears 14 and 43 and between the gear 44 and the internal gear 21 any desired speed or reversed rotation may be obtained relative to a given speed of the crankshaft 10 of the engine 1, although it is more desirable that gear 43 be of the same diameter as gear 14, and that gear 44 be of the same diameter as gear 19, so that reverse speeds of shaft 23 will be the same as forward speed of shaft 23; that is to say, that one hundred per cent reverse speeds be obtained.

Since the gears 14 and 43 are permanently meshed with each other and the gears 19 and 21 and 44 and 21 are permanently meshed with each other, it is essential that the clutch collars 34 and 45 shall not be permitted to both engage their respective gears 14 and 43 at the same time. For this reason, I have provided a clutch operating yoke 48 which in effect is a double yoke having a pair of fingers 49 and 50 extending upwardly above the yoke shaft 51 to engage pins 52 and 53 on opposite sides of a loose ball bearing collar 54 surrounding the dog clutch collar 34 while the similar pair of fingers 55 and 56 extend downwardly below the yoke shaft 51 to engage a pair of pins 57 and 58 upon a loose ball bearing collar 59 on the dog clutch collar 45. The yoke shaft 51 is journaled at one of its ends in a suitable bearing 60 formed upon the side wall of the casing 7, while the opposite end of the yoke shaft 51 extends through a bearing 62 on the opposite side of the casing 7 to the exterior of the casing to permit the connection thereto of a suitable operating lever 63 so that by rocking the lever 63 in a counterclockwise direction it will move the clutch collar 34 into clutching relation with the gear 14 and at the same time will move the clutch collar 45 out of clutching relation with the gear 43 and movement of the operating lever 63 in a clockwise direction will engage the clutch collar 45 and disengage the clutch collar 34. The yoke shaft 51 may extend through each side of the casing 7, and the lever 63 may be placed on either end of the shaft 51, as shown at 63a.

It will be noted from the foregoing description that I have provided a gearset which is adaptable to any construction of internal combustion engine or other prime mover in which any desired reduction in speed between the drive shaft of the prime mover and the driven shaft may be obtained, and in which by the employment of a single countershaft 37 I can secure a reverse rotation of the driven shaft 23 at any desired speed, preferably, however, at the same speed whether forward or reverse.

It will be observed that by reason of the employment of the internal gear 21 meshed with both the main drive gear 19 and the reversing gear 44, I am enabled to get any relative ratio of speed between the crankshaft and the driven shaft, and I am enabled to maintain the gearset extremely compact so that it occupies a relatively small space both longitudinally with respect to the engine and propeller shaft and also radially with respect thereto, the center line of the driven shaft 23 being offset from the center line of driving shafts 13 and 17 approximately half the diameter of the gear 21 or of the gear 44.

The arrangement of the two dog clutch collars 34 and 45 for engaging either the main drive gear 19 for forward drive, or the reverse gear 44 for reverse drive by the manipulation of the operating lever 63, permits the employment of a relatively simple control mechanism illustrated particularly in Figs. 1, 3, and 6 as comprising a shaft 64 which may be formed as an outwardly extending boss secured upon or formed integrally with the side wall of the gearset casing 7 and upon which is mounted a double cam 65. The double cam 65 has a cam face 66 formed upon one of its ends adapted to engage a pair of rollers 67 and 68 attached to bolts 69 and 70, respectively, which in turn engage opposite ends of the operating lever 63 for the dog clutch operating shaft 51. The cam surface 66 is so shaped that whenever the cam is swung from its full line position, as shown in Fig. 6, to its dotted line position, as shown in this figure, it will cause the operating lever 63 to be swung in a counterclockwise direction to rock the clutch collar yoke 48 to engage the clutch collar 34 with the gear 14, connecting my gearset for forward drive of the propeller shaft 3 as diagrammatically illustrated in Fig. 4, and when the cam 65 is swung in the opposite direction the cam surface will rock the yoke operating lever 63 in the opposite direction to connect my gearset for reverse rotation of the propeller 3, as diagrammatically illustrated in Fig. 5. It will be noted that when the cam 65 is in its neutral or full line position, as shown in Fig. 6, the clutch collars 34 will be in their neutral or disengaged position, as shown in Fig. 2, this representing the neutral position of my gearset wherein neither forward nor reverse motion is transmitted to the propeller shaft 3.

By employing the cam 65 to selectively engage the clutch collars 34 and 45, I can employ a single operating handle 71 to control either the forward or the rearward movement of the propeller shaft 3 or to stop the propeller shaft 3. In order to prevent undue wear of the clutch dogs 35, 36, and 46, 47 when they are to be engaged and disengaged, it is necessary to disconnect the crankshaft 18 of the engine from driving relation with the gears 14 and 43 during the engagement and disengagement of the clutch dogs 35 and 36, and 46 and 47, by employing the usual disc clutch 4 for this purpose, and the cam 65 may therefore be provided with a forwardly extending cam surface 72 adapted to engage a roller 73 secured to the clutch operating arm 74 mounted upon the shaft 75 normally employed for the engagement and disengagement of the discs 11 of the disc clutch 4. Any type of friction clutch may be used, although disc clutches, such as is used in the motor vehicle industry appear most adaptable. The cam face 72 is so shaped that the disc clutch plates 11 are engaged at all times except when the dog clutch collars 34 and 45 are being moved along the splined shafts 17 and 37.

It will be noted from an inspection of Fig. 6 that the cam surface 72 has a notch or low level 76 thereon in which the roller 73 is received whenever the operating handle 71 is in its neutral or gear disengaging position and that whenever the cam 65 is swung from its neutral position the roller 73 will be required to ride up upon a high surface of the cam until the cam 65 has arrived in such position that either the clutch dogs 35 and 36, or 46 and 47, are engaged, after which time the roller 73 will be received in a notch 77 or 78, respectively. Thus it will be apparent that as the operating handle 71 is moved from its neutral position toward its forward drive position the operating arm 74 for the disc clutch will disengage the clutch and hold this clutch disengaged until after the dogs 35 and 36 have been completely engaged, after which time the roller 73 will ride down into the notch 77, allowing the disc clutch 4 to re-engage and apply power to the gear 14.

Likewise, when the handle 71 is moved in the opposite direction to disengage the clutch dogs 35 and 36 the disc clutch 4 will be moved out of engagement until the clutch dogs 35 and 36 are disengaged. Also, if the handle 71 is moved toward its reverse drive position, the disc clutch 4 will be disengaged until the clutch dogs 46 and 47 have been engaged and then the roller 73 will ride down into the notch 78, re-engaging the disc clutch.

The lever and cam actuating mechanism above described may be placed either on the outside of the gear casing 7, or within that casing and accessible from the top cover plate 79, shown in Fig. 2.

It will therefore be apparent that I have provided a gearset in which with the operation of a single operating lever 71 in one direction the engine clutch is disengaged and re-engaged in synchronism with the engagement and disengagement of the clutch dogs 35 and 36 effecting the completion of the gear train necessary to drive the propeller shaft in the forward direction while a simple movement of the operating handle in the opposite direction will cause the gear train to be set up for a reverse operation and will be accompanied by automatic engagement and disengagement of the clutch in synchronism with the establishment of the gear train for this movement, the engine clutch being disengaged whenever the dog clutches are being moved.

The problem of lubricating my gearset and reduction gear is, by reason of the construction hereinbefore described, a relatively simple matter, the casing 7 constituting a housing which may be filled to any desired level with oil or other lubricant which may be freely passed into the gear housing 26a through suitable openings 80 in the rear wall 9 of the casing and similarly the bearings 24 and 25 may receive oil or lubricant through suitable lubricant openings 81 in the rear wall of the gear housing 26a. However, if desired, the bearings 24 and 25 may be separately lubricated by an oil line extending from a suitable pump or other lubricant pressure system, as will be understood by those skilled in the art. If desired, the lubrication of my gearset may be obtained directly from the crankcase of the engine 1 by permitting free passage of the oil in the crankcase to the casing 7, though it will be understood by those skilled in the art that when a clutch 4 is used which must operate dry, I prefer to supply oil to the gearset independently of the crankcase of the engine.

While I have shown and described the preferred embodiment of my invention, I do not desire to be limited to any of the details of construction shown herein, except as defined in the appended claims.

I claim:

1. In a combined gearset and reduction gear for coupling a drive shaft operating in a continuous direction to drive a driven shaft in either of two directions at a reduced speed, a bell gear secured to said driven shaft, a main driving gear and a reverse driving gear both meshed with internal teeth on said bell gear, means for mounting said main drive gear for rotation about an axis aligned with said drive shaft, a countershaft mounting said reverse driving gear for rotation about an axis parallel to the axis of said drive shaft, a gear driven by said drive shaft, an idler gear meshed with said last named gear and rotatable on said countershaft, and means for selectively coupling said drive shaft to said main drive gear, and means for selectively coupling said idler gear to said reverse drive gear.

2. In a combined gearset and reduction gear for coupling a drive shaft operating in a continuous direction to drive a driven shaft in either of two directions at a reduced speed, a bell gear secured to said driven shaft, a main driving gear and a reverse driving gear both meshed with internal teeth on said bell gear, a shaft mounting said main driving gear for rotation about an axis aligned with said drive shaft, a countershaft mounting said reverse driving gear for rotation about an axis parallel to the axis of said drive shaft, a gear driven by said drive shaft, an idler gear meshed with said last named gear and rotatable on said countershaft, and means for selectively coupling said drive shaft to said main drive gear and for selectively coupling said idler gear to said reverse drive gear.

3. In a combined gearset and reduction gear for coupling a drive shaft operating in a continuous direction to drive a driven shaft in either of two directions at a reduced speed, a bell gear secured to said driven shaft, a main driving gear and a reverse driving gear both meshed with internal teeth on said bell gear, means for mounting said main drive gear for rotation about an axis aligned with said drive shaft, a countershaft mounting said reverse driving gear for rotation about an axis parallel to the axis of said drive shaft, a gear formed on said drive shaft and having a recess therein for rotatably receiving one end of said main drive gear shaft, an idler gear meshed with said last named gear and rotatable on said countershaft, and means for selectively coupling said drive shaft to said main drive gear and for selectively coupling said idler gear to said reverse drive gear.

4. In a combined gearset and reduction gear for coupling a drive shaft operating in a continuous direction to drive a driven shaft in either of two directions at a reduced speed, a bell gear secured to said driven shaft, a main driving gear and a reverse driving gear both meshed with internal teeth on said bell gear, means for mounting said main drive gear for rotation about an axis aligned with said drive shaft, a countershaft mounting said reverse driving gear for rotation about an axis parallel to the axis of said drive shaft, a gear formed on said drive shaft and having clutch dogs formed upon the outer face thereof, an idler gear meshed with said last named gear and rotatable on said countershaft, a clutch collar coupled to said main drive gear and engageable with the dogs on said drive shaft gear to selectively engage and disengage said main drive gear with said drive shaft, clutch dogs on said idler gear, and a dog clutch collar on said countershaft engageable therewith to selectively engage and disengage said reverse gear with said idler gear.

5. In a combined gearset and reduction gear for coupling a drive shaft operating in a continuous direction to drive a driven shaft in either of two directions at a reduced speed, a gear case having a front and a rear wall, a gear housing mounted upon and extending exteriorly of the rear wall of said gearset, a bell gear in said gear housing connected to said driven shaft, a main driving gear meshed with internal teeth on said bell gear, a shaft secured to said main driving gear and extending through said rear wall of said casing and bearing thereon, the end of said shaft being journaled on said drive shaft in axial alignment therewith, a gear formed on said drive shaft, a countershaft journaled in the front and rear walls of said casing and extending parallel to the axis of said drive shaft, a reverse gear secured to said countershaft and meshed with internal teeth of said bell gear, an idler gear rotatable upon said countershaft and meshed with said drive shaft gear, and clutch means on said main driving gear shaft and on said countershaft for selectively coupling said main drive gear and said drive shaft, and for selectively coupling said reverse gear to said idler gear.

6. In a combined gearset and reduction gear for coupling a drive shaft operating in a continuous direction to drive a driven shaft in either of two directions at a reduced speed, a gear case having a front and a rear wall, a gear housing mounted upon and extending exteriorly of the rear wall of said gearset, openings in said rear wall of said gear case communicating with said gear housing to pass lubricant between the same, a bell gear in said gear housing connected to said driven shaft, a main driving gear meshed with internal teeth on said bell gear, a shaft secured to said main driving gear and extending through said rear wall of said casing and bearing thereon, the end of said shaft being journaled on said drive shaft in axial alignment therewith, a gear formed on said drive shaft, a countershaft journaled in the front and rear walls of said casing and extending parallel to the axis of said drive shaft, a reverse gear secured to said countershaft and meshed with internal teeth of said bell gear, an idler gear rotatable upon said countershaft and meshed with said drive shaft gear, and clutch means on said main driving gear shaft and on said countershaft for selectively coupling said main drive gear and said drive shaft, and for selectively coupling said reverse gear to said idler gear.

7. In a combined gearset and reduction gear for coupling a drive shaft operating in a continuous direction to drive a driven shaft in either of two directions at a reduced speed, a gear case having a front and a rear wall, a gear housing mounted upon and extending exteriorly of the rear wall of said gearset, a bell gear in said gear housing connected to said driven shaft, a main driving gear meshed with internal teeth on said bell gear, a shaft secured to said main driving gear and extending through said rear wall of said casing and bearing thereon, the end of said shaft being journaled on said drive shaft in axial alignment therewith, a gear formed on said drive shaft, a countershaft journaled in the front and rear walls of said casing and extending parallel to the axis of said drive shaft, a reverse gear secured to said countershaft and meshed with internal teeth of said bell gear, an idler gear rotatable upon said countershaft and meshed with said drive shaft gear, clutch means on said main driving gear shaft and on said countershaft for selectively coupling said main drive gear and said drive shaft and for selectively coupling said reverse gear to said idler gear, a clutch operating yoke pivoted between said countershaft and said main driving gear shaft engageable with both of said clutch means to alternately move one of said clutch means toward engaging position while moving the other of said clutch means toward disengaging position, and moving the other of said clutch means toward engaging position while moving said one clutch means towards disengaging position.

8. In a combined gearset and reduction gear for coupling a drive shaft operating in a continuous direction to drive a driven shaft in either of two directions at a reduced speed, a gear case having a front and a rear wall, a gear housing mounted upon and extending exteriorly of the rear wall of said gearset, a bell gear in said gear housing connected to said driven shaft, a main driving gear meshed with internal teeth on said bell gear, a shaft secured to said main driving gear and extending through said rear wall of said casing and bearing thereon, the end of said shaft being journaled on said drive shaft in axial alignment therewith, a gear formed on said drive shaft, a countershaft journaled in the front and rear walls of said casing and extending parallel to the axis of said drive shaft, a reverse gear secured to said countershaft and meshed with internal teeth of said bell gear, an idler gear rotatable upon said countershaft and meshed with said drive shaft gear, clutch means on said main driving gear shaft and on said countershaft for selectively coupling said main drive gear and said drive shaft and for selectively coupling said reverse gear to said idler gear, a clutch operating yoke pivoted between said countershaft and said main driving gear shaft engageable with both of said clutch means to alternately move one of said clutch means toward engaging position while moving the other of said clutch means towards disengaging position, and moving the other of said clutch means toward engaging position while moving said one clutch means towards disengaging position, and gear control means for selectively engaging and disengaging said clutch means including a handle or control lever, means pivotally mounting said handle or control lever, and a cam secured to said handle for rocking said yoke alternately in one direction or the other.

FRED E. PETTIT, Jr.